United States Patent Office 3,487,213
Patented Dec. 30, 1969

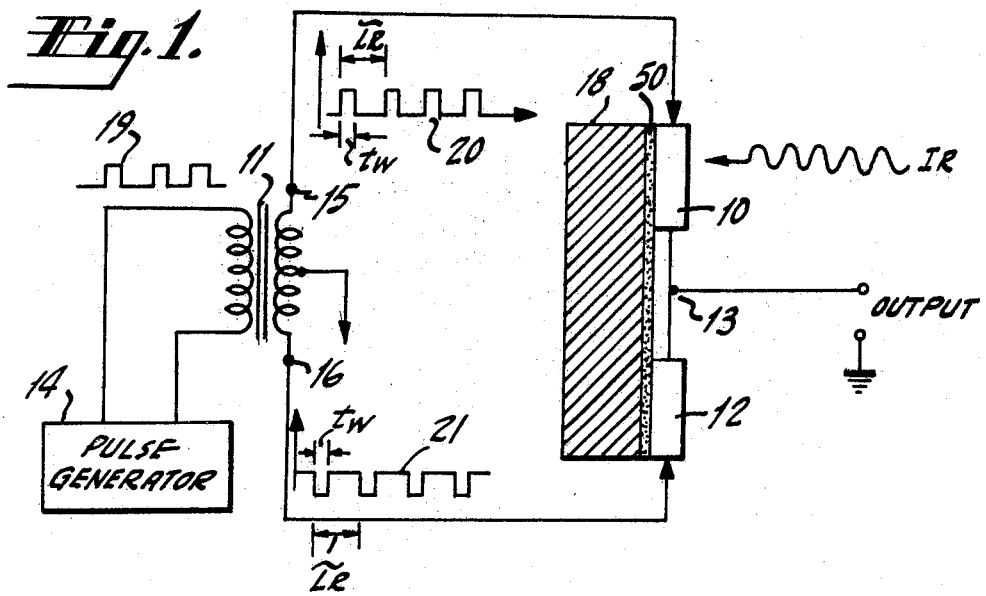
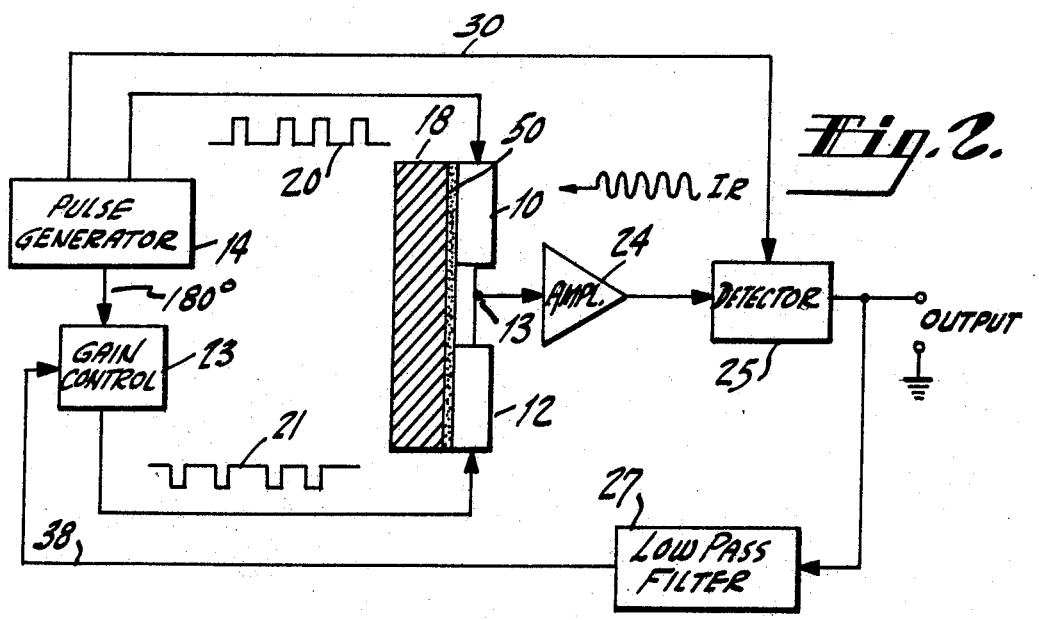

3,487,213
CIRCUITS FOR THERMISTOR BOLOMETER WITH INCREASED RESPONSIVITY
John J. Horan, Princeton, N.J., and Andrew C. Rudomanski, North Ridge, Calif., assignors to RCA Corporation, a corporation of Delaware
Filed Feb. 24, 1966, Ser. No. 529,805
Int. Cl. H01j *39/00, 39/12*
U.S. Cl. 250—83.3     6 Claims

ABSTRACT OF THE DISCLOSURE

The active plate of a thermistor bolometer bridge is biased with a short duty cycle first pulse train having a given pulse repetition rate. The compensating thermistor plate of the bolometer bridge is biased with a second pulse train having the same short duty cycle and repetition rate as the first pulse train, the second pulse train being 180° out of phase with the first pulse train. The pulse repetition rate is much greater than the reciprocal of the thermal constant of the bolometer bridge. Since the responsivity of the bolometer is directly proportional to the respective amplitudes of the pulses forming the first and second pulse trains, but the heating of the bolometer bridge is inversely proportional to the duty cycle of the first and second pulse trains, by utilizing short duty cycle pulse trains of higher amplitude, higher responsivity can be achieved without overheating the bolometer bridge.

---

This invention relates to radiation detectors and more particularly to an improved thermistor bolometer.

Thermistors are usually semiconductors composed of oxides of manganese, nickel and colbalt. When suitably processed, mixtures of these oxides form structures which possess a large temperature coefficient of resistance. It is this property which makes the thermistor useful in electromagnetic radiation detection apparatus.

Thermistor bolometers are infrared radiation transducers which are being used increasingly in such diverse applications as satellite horizon sensors, weather satellites, military reconnaissance mapping, industrial plants, spectrometers, rocket exhausts, and railroad hot box detectors. As new uses are found and older applications are improved, there is a need for a bolometer which possesses greater responsivity than those known in the art.

Certain prior art bolometers use a thermistor bridge configuration and to function properly require that a bias voltage be applied to this bridge and the radiation to be detected be chopped by suitable means. The chopping or periodic interrupting of the radiation is usually implemented by mechanical or optical means. It can be shown that the sensitivity or responsivity of a bolometer increases directly with the bias voltage applied. Hence the greater the output signal from a bolometer bridge the greater is the thermistor bias needed. However, the maximum voltage which can be applied to the thermistor element is determined by the rate at which Joule heat generated in the thermistor can be conducted to the detector base and mounting fixture or a suitably connected heat sink. In order to safely operate thermistor bolometers, in the prior art, over a range of ambient temperatures, a direct current (D.C.) bias voltage of 60% to 80%, depending on the limits specified by the manufacturer, of peak thermistor voltage is applied. The peak thermistor voltage is the point on the thermistor current-voltage characteristic where a further increase of current through the thermistor substantially increases the self heating of the element causing the voltage to pass through a maximum. The maximum voltage is referred to as the peak bias. At 60% of this peak bias for a 25° centrigrade ambient, the thermistor bolometer operates at about 88% of its maximum responsivity. In many applications this is not sufficient and a greater effective responsivity is necessary.

Another disadvantage of many present bolometers is due to the mismatch in thermistor elements or flakes. As was mentioned previously, bolometers typically consist of bridge configurations of thermistors. One or more thermistors, referred to as the active thermistors, behave as radiation detectors and change resistance according to the intensity of the applied radiation. Also contained in the bridge circuit are temperature compensating thermistors which are shielded from radiation. The function of the compensating thermistor is to maintain the same mean temperature as the active thermistor. The action of the compensating thermistor serves to balance the bridge over the operating range of the bolometer. When radiation impinges on the bolometer bridge's active thermistor, the active thermistor produces a D.C. change which is proportional to the radiation. If there is no radiation present, the output should be zero or as close to zero as possible. The inability of the bolometer to maintain a zero D.C. output in the absence of radiation is referred to as D.C. offset. This is normally compensated by mechanically rotating choppers.

It is therefore an object of the present invention to provide an improved thermistor bolometer.

Another object is to provide an improved thermistor bolometer with increased responsivity.

Another object is to provide an improved thermistor bolometer which does not require mechanical chopping of the radiation.

A further object is to provide an improved thermistor bolometer which substantially reduces the D.C. offset found in prior art devices.

In accordance with these and further objects of the invention, an active and a compensating thermistor element or flake are arranged in a bridge configuration. The bias is obtained from a source which produces two shaped pulse trains 180 degrees out of phase with one another. These opposite polarity pulse trains are applied to the thermistors in a bridge configuration forming a biasing network for the bridge. The restrictions on the pulse trains are that they have a repetition rate which is much faster than the reciprocal of the thermal time constants of the thermistors, and that they have a pulse width which is substantially less than the repetition rate or spacing between the pulses. These restrictions enable the bridge to operate at its maximum efficiency or responsivity. Included in the bolometer circuit is an amplifier which feeds a synchronous detector. The amplifier amplifies changes in the bridge circuit due to impinging radiation, these changes are detected, and the component due to the D.C. offset is filtered and fed back to the pulse train source to adjust the amplitude of one of the pulse trains, tending to compensate for the offset in the bridge.

These and other objects and advantages, the nature of the present invention, and its various features, will appear more fully upon consideration of the various illustrative embodiments now to be described in detail in connection with the accompanying drawings in which:

FIG. 1 is a block diagram of a thermistor bridge according to this invention.

FIG. 2 is a schematic of an illustrative embodiment of the invention.

If reference is made to FIGURE 1, there is shown a bolometer bridge circuit. Numeral 10 references the active thermistor flake of the bridge circuit. One terminal of the thermistor 10 is coupled to the secondary of a transformer 11, which may be a pulse transformer. The opposite terminal of the secondary of transformer 11 is coupled to one terminal of another thermistor element or flake 12. Element 12 is a temperature compensating thermistor or flake. As was mentioned previously the temperature compensating thermistor 12 is shielded from radiation by suitable means, not shown, and maintains the same mean temperature as the active thermistor flake 10 because both are usually attached to the relatively massive bolometer housing's base 18. In the so-called immersed bolometer the metallic immersion lens is analogous to the bolometer base 18. It is to be noted that the principles described with regard to this invention would be equally applicable to both immersed and unimmersed bolometers. The base 18, which is usually a metal structure, is shown as being separated from the thermistor elements 10 and 12 by a backing block 50. Block 50 is usually a dielectric material with good heat conductivity. Block 50 is cemented or otherwise attached to the metallic base 18. The second terminals of the two thermistors 10 and 12 are coupled together to form a junction point 13. It is at junction 13 that the output from the thermistor bridge is taken. The primary of transformer 11 is coupled to a source of pulses or a pulse generator 14, a connection being provided from a tap on the secondary winding of transformer 11 to a point of reference potential. The operation of the circuit shown in FIGURE 1 will now be described.

The responsivity of a detector such as a thermistor bolometer or bridge is defined as the ratio of the voltage derived from the bridge to the incident radiation inciting that voltage. It is known and can be shown that the responsivity increases directly with the biase voltage. However, there is a limit to the bias voltage which can be applied to a thermistor. This maximum value of bias is 0.6 to 0.8 of the peak voltage. If this bias value is exceeded by a larger D.C. value, the thermistor bolometer will thermally run away and when runaway occurs the device is ineffective for its detector application. Using the configuration shown in FIGURE 1 the output signal can be increased by factors of 10 to 100 times, without thermal runaway. This increase in output voltage substantially increases the responsivity, as can be deducted from the above definition, for the same ambient temperature or for the same value of incident radiation.

To obtain this increase in responsivity, the bolometer bridge, comprising the active thermistor 10 and the compensating thermistor 12, is biased by two pulse trains 180 degrees out of phase and having certain relations between the repetition rate and the duty cycle of the pulse trains. These relations will be discussed further. FIGURE 1 shows a pulse generator 14 coupled to the primary of transformer 11. It is known that a transformer can shift the phase of a signal by 180 degrees, and if the center tap of the transformer 11 is grounded or returned to a point of reference potential, two outputs 180 degrees out of phase will be produced at the opposite terminals 15 and 16 of the transformer. This is referred to as push-pull operation. There are other ways for obtaining two signals 180 degrees out of phase which could be used as well. Such techniques employ a differential amplifier, a phase splitter, or a device such as an astable multivibrator, which inherently produces two pulses trains 180 degrees out of phase at each transistor's collector, or tube's plate, of the astable multivibrator. Such circuits are known in the art and are not considered part of this invention. Hence the pulse generator 14 produces a train of pulses which has the waveshape indicated by pulse train 19. Transformer 11 serves to convert the pulse train 19 to two pulse trains 20 and 21 which are 180 degrees out of phase. The important thing being that when pulse train 20 is positive-going, pulse train 21 is negative-going, and vice versa. A repetitive waveshape such as 20 and 21 has an root mean square (R.M.S.) value associated with it, which can be used to bias the bridge, providing the following related restrictions are observed. The repetition rate $t_r$ of the pulses in each train as 20 and 21 must be faster than the bolometer time constant $t_B$. The repetition rate $t_r$ is the time between the same point on successive pulses, and is indicated on FIGURE 1. The bolometer time constant $t_B$, determines how quickly the bolometer will respond to a change in radiation. This time constant is approximately equal to $$tB \cong Ce/Ke \qquad (1)$$

where $Ce$=dynamic heat capacity—watts/° C.
$Ke$=dynamic thermal conductivity—(watts/sec. ° C.)

where ° C.=degrees centrigrade

The repetition rate $t_r$ of the pulse trains is made larger than the reciprocal of the thermal time constant, $t_B$, to assure that the temperature of the thermistors used in the bolometer remains constant from pulse to pulse. This can be expressed by the following relation:

$$t_r > \frac{10}{t_B} \qquad (2)$$

Relationship 2 indicates that the repetition rate should be ten or more times greater than the reciprocal of the bolometer time constant $t_B$. Repetition rates greater than 10 such as 100 or more times the reciprocal of $t_B$ will also be adequate. The duty cycle D, of the pulse trains, 20 and 21, is the pulse width, $t_w$ shown in FIGURE 1, divided by the time duration between pulses, which can be seen from FIGURE 1 to be $t_r - t_w$, hence D, the duty cycle is given by:

$$D = \frac{t_w}{t_r - t_w} \qquad (3)$$

The R.M.S. value of the pulse trains 20 and 21 is made equal to 60% of the peak voltage, $V_p$, thus the peak voltage of the pulse train $V_{pp}$ is equal to:

$$V_{pp} = \frac{.6 \; v_{\cdot p}}{D^{1/2}} \qquad (4)$$

Since the output signal from the bolometer bridge is derived from the peak bias, the output signal can be increased by factors of 10 to 100 times by controlling the duty cycle, D. For example, assume we have a pulse repetition rate of one millisecond, and a pulse width, $t_w$, of one microsecond. Inserting these numbers into Equation 3 we have a duty cycle D equal to:

$$D = \frac{1 \times 10^{-6} \; \text{sec.}}{10^{-3} - 10^{-6} \; \text{sec.}} \cong \frac{10^{-6}}{10^{-3}} \cong 10^{-3} = \frac{1}{1000}$$

The effective peak voltage is now given by Equation 4 and is:

$$V_{pp} = \frac{.6 \; v_{\cdot p}}{\sqrt{D}} = .6 \; v_{\cdot p} \sqrt{1000}$$

This shows approximately a 30 times increase ($\cong \sqrt{1000}$) in effective peak voltage $V_{pp}$, which corresponds to a substantial increase in responsivity. Assumed in the analysis is that the pulse rise and fall times are small compared to the pulse width. This is a valid assumption as pulse rise times and fall times in the order of nanoseconds ($10^{-9}$ seconds) are easily obtainable. There is also shown, in FIGURE 1, a wave designated IR which represents radiation to be detected by the bolometer. Assuming that the active thermistor 10 and the compensating thermistor 12 have the same I–V curve with temperature, the bridge shown in FIGURE 1 would be balanced in the absence of infrared radiation. This would result in a zero signal at the output terminal 13. If an infrared wave, such as the wave indicated as IR, excites the active thermistor 10, it will cause element 10 to change its resistance, the change in resistance causes an unbalance of the bridge circuit and an output voltage appears at terminal 13, representing the amount of infrared present.

If reference is made to FIGURE 2, there is shown in block diagram another embodiment of a thermistor bolometer bridge. A pulse generator 13 similar to the one described in conjunction with FIGURE 1, is coupled to an active thermistor 10. The pulse generator 14 produces two pulse trains 20 and 21 of opposite polarity and equal amplitude or 180° out of phase. In series with the lead from the pulse generator 14, to the compensating thermistor 12 is a gain control circuit 23, whose function will be described. The output terminal 13 of the bolometer is coupled to an amplifier 24. The output of amplifier 24 is coupled to a detector circuit 25, which may be a synchronous detector. There is another input to detector 25, which is from the pulse generator 14, via lead 30. The output of detector 25, serves as the output of the bolometer and is also coupled to a low pass filter 27. The output of the filter 27 is coupled via lead 38 to the gain control circuit 23.

As was mentioned previously in connected with FIG. 1, if the thermistors 10 and 12 exhibit the same characteristics with temperature, the bridge will be balanced over a wide ambient for the absence of infrared radiation. However, in actual practice it is very difficult to obtain two thermistors, such as 10 and 12, that track or follow exactly. Hence due to the variation in characteristics of thermistors 10 and 11, there is an imbalance of the bolometer over the range of ambient temperatures. This imbalance results in a D.C. offset, which was previously explained. The result of such an offset limits the detection capabilities of the bridge. In the circuit shown in FIGURE 2 use is made of the alternating pulse bias signal generated by pulse generator 14, to correct this defect. The output from the thermistor bridge comprising thermistors 10 and 12 at junction 13 is proportional to the infrared signal to be detected plus the mismatch signal due to the imbalance of the characteristics of the thermistors 10 and 12. The output at junction 13 is amplified by amplifier 24, which may be a multi-stage transistor or tube circuit having the desired response, whose response depends on the range of frequencies to be detected by the bolometer. The output of amplifier 24, which contains the desired radiometric signal due to the IR wave, and the mismatch signal is fed to a synchronous detector 25. The detector is also coupled to the pulse generator 14 which serves to activate the detector 25 so that it operates in synchronism with the pulse trains 20 and 21. The input to the detector 25 from the generator 14 via lead 30 may be either the pulse train 20, the pulse train 21 or a further pulse train in synchronism with the pulse trains 20, 21. The output from detector 25 is a D.C. output proportional to the infrared or radiometric input to the bolometer plus a variable D.C. signal proportional to the mismatch in the thermistor's 10 and 12 resistances. The low pass filter 27, is designed to pass the variable D.C. signal due to the mismatch, and this signal is used to control the amplitude of the pulse train 21 by injecting this signal into the gain control circuit 23's control lead via lead 38. Any suitable gain control technique may be used for the circuit 23. The amplitude controlled pulse train 21 serves to bias the compensating thermistor 12. The change in amplitude of pulse train 21 serves to compensate for the difference in resistance of the thermistors 10 and 12. This technique serves to substantially reduce the offset and allows the bolometer to operate efficiently. The separation of the offset is accomplished without difficulty using this technique as the thermal time constant of the detector consisting of the thermistors and the associated heat sinks, such as the metallic base 18 and the backing base 50, is long compared to the lowest frequency of the radiometric signal or I.R. to be detected. A further advantage of the technique is that the Johnson noise and LF noise normally added by the amplifier in a D.C. bias system is substantially reduced due to the action of the feedback path formed by detector 25, filter 27 and the gain control circuit 23.

What is claimed is:
1. An apparatus for detecting infrared radiation comprising:
 (a) an active and a compensating thermistor flake each having two terminals and specified time constants,
 (b) means for coupling one terminal of said active flake with one terminal of said compensating flake to form a junction,
 (c) a pulse train source capable of producing two pulse trains 180° out of phase, the width of said pulses comprising said trains being substantially less than the repetition rate of said pulses, said repetition rate being much faster than the reciprocal of said specified time constant,
 (d) means for coupling one of said pulse trains to said active thermistor flake's other terminal to provide an optimum bias for said active flake, while maintaining the quiescent temperature constant,
 (e) means for coupling said other pulse train to said other terminal of said compensating thermistor flake to provide an optimum bias for said compensating flake, while maintaining the quiescent temperature constant,
 (f) automatic gain control means coupled to said pulse train source to control the amplitude of one of said pulse trains,
 (g) an amplifier having an input and output terminal, said amplifier's input terminal being coupled to said junction to detect current changes at said junction when said infrared radiation is directed upon said active flake,
 (h) a detector having an input terminal coupled to said amplifier's output terminal to convert said current changes at said junction to a varying D.C. signal,
 (i) a filter having an input coupled to said detector's output terminal,
 (j) means for coupling said filter's output terminal to said automatic gain control means causing the amplitude of said one of said pulse trains to vary in accordance with the differences in said specified time constants.

2. An apparatus for detecting infrared radiation comprising:
 (a) an active and a compensating thermistor flake, each having two terminals and different temperature resistance characteristics,
 (b) means for coupling one of said active flake's terminals to one of said terminals of said compensating flake,
 (c) a pulse source capable of producing two pulse trains of equal amplitude and opposite polarity,
 (d) means for applying one of said pulse trains to said other terminal of said active flake causing said active flake to be biased,
 (e) a gain control circuit having an input, output and control terminal,
 (f) means for applying said other pulse train to said gain control circuit's input terminal,
 (g) means for coupling said gain control circuit's output terminal to said other terminal of said compensating flake causing said compensating flake to be properly biased,
 (h) means for supplying a control signal proportional to said different temperature resistance characteristics to said gain control circuit's control terminal, causing said gain control circuit to change the amplitude of said other pulse train affording compensation for said thermistor's different resistance temperature characteristics.

3. In a thermistor bolometer of the type comprising a bridge circuit having a first arm thereof incorporating an active thermistor element adapted to be exposed to incident infrared radiation and a second arm thereof which is adjacent said first arm incorporating a compensating thermistor element, and biasing means coupled to said bridge circuit for applying a biasing current through each of said active thermistor element and said compensating thermistor element; the improvement wherein said biasing means includes means for applying a first train of first amplitude pulses having a given duty cycle of significantly less than one-half which occur at a given repetition rate as a biasing current through said active thermistor element and for applying a second train of second amplitude pulses having said given duty cycle which occur at said given repetition rate as a biasing current through said compensating thermistor element with respective pulses of first and second trains occurring in time coincidence with each other, said given repetition rate being much higher than the reciprocal of the thermal time constant of said thermistor elements within said bridge circuit, whereby the responsivity of said bolometer for any fixed rate of heating of said thermistor elements by the respective biasing currents therethrough is increased as a direct function of the value of said first and second amplitudes and as an inverse function of the length of said duty cycle.

4. The bolometer defined in claim 3, wherein thermal runaway occurs in response to the sum of the heating of said thermistor elements by biasing currents and by incident radiation on said active thermistor element exceeding a predetermined rate, and wherein said first and second amplitudes are made as high as possible without exceeding said predetermined rate of total heating of said thermistor elements.

5. The bolometer defined in claim 4, wherein said given duty cycle is in the order of $10^{-3}$.

6. The bolometer defined in claim 3, further including controlled means for varying said second amplitude with respect to said first amplitude, and a feedback loop coupling the output of said bridge circuit to said controlled means and responsive to the degree of D.C. offset appearing in the output of said bridge circuit for controlling said controlled means to minimize said D.C. offset.

RALPH G. NILSON, Primary Examiner

SAUL ELBAUM, Assistant Examiner

U.S. Cl. X.R.

73—355; 323—68